(12) United States Patent
Olsson et al.

(10) Patent No.: US 10,225,882 B2
(45) Date of Patent: Mar. 5, 2019

(54) METHOD AND APPARATUS FOR SETTING AN INACTIVITY TIMER

(71) Applicant: Telefonaktiebolaget LM Ericsson (publ), Stockholm (SE)

(72) Inventors: Lasse Olsson, Stora Höga (SE); Zhiwei Qu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/522,208

(22) PCT Filed: Oct. 30, 2014

(86) PCT No.: PCT/CN2014/089856
§ 371 (c)(1),
(2) Date: Apr. 26, 2017

(87) PCT Pub. No.: WO2016/065563
PCT Pub. Date: May 6, 2016

(65) Prior Publication Data
US 2017/0332438 A1    Nov. 16, 2017

(51) Int. Cl.
*H04W 76/38* (2018.01)
*H04W 28/12* (2009.01)
(Continued)

(52) U.S. Cl.
CPC .......... *H04W 76/38* (2018.02); *H04W 28/12* (2013.01); *H04W 72/04* (2013.01); *H04W 36/00* (2013.01)

(58) Field of Classification Search
None
See application file for complete search history.

(56) References Cited

U.S. PATENT DOCUMENTS

| 2012/0289232 A1 | 11/2012 | Östrup et al. |
| 2012/0329458 A1 | 12/2012 | Hjelmgren et al. |

(Continued)

FOREIGN PATENT DOCUMENTS

| CN | 101754397 A1 | 6/2010 |
| EP | 2683183 A1 | 1/2014 |
| WO | 2014069748 A1 | 5/2014 |

OTHER PUBLICATIONS

3GPP TS 23.401 V125.0 (Jun. 2014) 3rd Generation Partnership Project; Technical Specification Group Services and System Aspects; General Packet Radio Service (GPRS) enhancements for Evolved Universal Terrestrial Radio Access Network (E-UTRAN) access (Release 12) Jun. 2014 (305-pages).

(Continued)

*Primary Examiner* — Hong S Cho
(74) *Attorney, Agent, or Firm* — Sage Patent Group

(57) ABSTRACT

A method in an access point (AP) for setting an inactivity timer in a radio communication network comprising the AP, a mobile management entity (MME) and a session management entity (SME). The method includes obtaining an inactivity timer value for one or more user equipments (UEs) served by the AP and transmitting the inactivity timer value to the MME for notifying the SME of the inactivity timer value for the one or more UEs. For each of the one or more UEs, the AP and the SME respectively maintain an inactivity timer associated with the UE based on the inactivity timer value and remove resources locally used for the UE when the inactivity timer expires.

12 Claims, 4 Drawing Sheets

(51) Int. Cl.
*H04W 72/04* (2009.01)
*H04W 36/00* (2009.01)

(56) References Cited

U.S. PATENT DOCUMENTS

| | | | | |
|---|---|---|---|---|
| 2014/0016614 | A1* | 1/2014 | Velev | H04W 4/70 370/331 |
| 2014/0242962 | A1* | 8/2014 | Choi | H04W 8/245 455/418 |
| 2014/0307659 | A1* | 10/2014 | Kweon | H04W 52/0254 370/329 |
| 2014/0321371 | A1* | 10/2014 | Anderson | H04W 76/38 370/329 |
| 2015/0223284 | A1* | 8/2015 | Jain | H04W 4/70 370/329 |
| 2015/0245325 | A1* | 8/2015 | Futaki | H04W 72/04 370/329 |
| 2015/0312950 | A1* | 10/2015 | Cartmell | H04W 76/38 370/329 |
| 2015/0373608 | A1* | 12/2015 | Zhu | H04W 76/25 370/252 |

OTHER PUBLICATIONS

3GPP TS 24.301 V125.0 (Jun. 2014) 3rd Generation Partnership Project; Technical Specification Group Core Network and Terminals; Non-Access-Stratum (NAS) protocol for Evolved Packet System (EPS); Stage 3 (Release 12) Jun. 2014 (367-pages).

3GPP TS 36.413 V12.2.0 (Jun. 2014) 3rd Generation Partnership Project; Technical Specification Group Radio Access Network; Evolved Universal Terrestrial Radio Access Network; (E-UTRAN); S1 Application Protocol (S1AP) (Release 12) Jun. 2014 (285-pages).

International Search Report and Written Opinion dated Jul. 28, 2015 for International Application Serial No. PCT/CN2014/089856, International Filing Date: Oct. 13, 2014 consisting of 6-pages.

Supplementary European Search Report dated May 29, 2018 for European Patent Application No. EP 14 90 5121 filed Oct. 30, 2014, consisting of 7-pages.

3GPP TR 23.887 V12.0.0 3rd Generation Partnership Project; Technical Specification Group Services and System Aspects; Study on Machine-Type Communications (MTC) and other mobile data applications communications enhancements (Release 12), Dec. 2013, consisting of 152-pages.

* cited by examiner

METHOD AND APPARATUS FOR SETTING AN INACTIVITY TIMER

CROSS-REFERENCE TO RELATED APPLICATIONS

This application is a Submission Under 35 U.S.C. § 371 for U.S. National Stage Patent Application of International Application Number: PCT/CN2014/089856, filed Oct. 30, 2014 entitled "METHOD AND APPARATUS FOR SETTING AN INACTIVITY TIMER," the entirety of both which are incorporated herein by reference.

TECHNICAL FIELD

The present technology relates to the field of radio communication, particularly to a method for setting an inactivity timer in the radio communication network. The technology also relates to an access point (AP), a session management entity (SME) and a computer readable storage medium for performing the method.

BACKGROUND

In the radio communication network based on the $3^{rd}$ generation partnership project (3GPP) protocol such as long term evolution (LTE), each UE initiating service request to the evolved Node B (eNB) will be set an inactivity timer which is used to track the length of the time when a UE is kept in idle state, i.e. no transmission between the UE and the eNB. Once the inactivity timer expires while the UE is still in idle state, the resources used for the UE in the eNB and the serving gateway (SGW) on the core side of the network will be released. Typically, the inactivity timer is kept by the mobility management entity (MME) and/or the eNB, and the SGW has no idea of the inactivity timer. If the inactivity timer expires, the MME or the eNB simply notifies the SGW to release the respective local resources used for the UE.

Since the eNB and the SGW release the resources used for the UE only when the inactivity timer expires, it is of great interest to set the inactivity timer as short as possible so that the occupied radio resources can be released earlier and used for other transmissions. Nonetheless, the frequent radio resources release undesirably results in a significant signaling load such as service request, handover, etc. As shown in FIG. 1, the length of inactivity timer is negatively correlated with the signaling rate. Hence, when the inactivity timer is set shorter, increasing resources in the entities of the core side such as the MME and SGW are consumed to handle the signaling. In order to make a tradeoff between the radio resources and the core resources, it is recommended to set the inactivity timer to be 61 seconds. However, more often than not, one can notice that this inactivity timer value is set to 5 seconds in practice. As such, the resources on the core side of the network are unduly occupied to handle the massive signaling resulted from the frequent radio resources release.

SUMMARY

It's an object of the present disclosure to resolve or alleviate at least one of the problems mentioned above.

A first aspect of the present disclosure is a method in an AP for setting an inactivity timer in a radio communication network comprising the AP, a MME and a session management entity (SME). The method comprises obtaining an inactivity timer value for one or more UEs served by the AP and transmitting the inactivity timer value to the MME for notifying the SME of the inactivity timer value for the one or more UEs. For each of the one or more UEs, the AP and the SME respectively maintain an inactivity timer associated with the UE based on the inactivity timer value and remove resources locally used for the UE when the inactivity timer expires.

A second aspect of the present disclosure is a computer readable storage medium storing instructions. When run on an AP, the instructions cause the AP to perform the steps of the method as described above.

A third aspect of the present disclosure is a method in a session management entity (SME) for setting an inactivity timer in a radio communication network comprising an AP, a MME and the SME. The method comprises obtaining an inactivity timer value for a UE served by the SME and transmitting the inactivity timer value to the MME for notifying the AP of the inactivity timer value for the UE. The AP and the SME respectively maintain an inactivity timer associated with the UE based on the inactivity time value and remove resources locally used for the UE when the inactivity timer expires.

A fourth aspect of the present disclosure is a computer readable storage medium storing instructions. When run on an SME, the instructions cause the SME to perform the steps of the method as described above.

A fifth aspect of the present disclosure is an AP configured to set an inactivity timer in a radio communication network comprising the AP, a MME and a SME. The AP comprises an obtaining unit and a transmitting unit. The obtaining unit is adapted to obtain an inactivity timer value for one or more UEs served by the AP. The transmitting unit is adapted to transmit the inactivity timer value to the MME for notifying the SME of the inactivity timer value for the one or more UEs. For each of the one or more UEs, the AP and the SME are respectively adapted to maintain an inactivity timer associated with the UE based on the inactivity timer value and remove resources locally used for the UE when the inactivity timer expires.

A sixth aspect of the present disclosure is a SME configured to set an inactivity timer in a radio communication network comprising an AP, a MME and the SME. The SME comprises an obtaining unit and a transmitting unit. The obtaining unit is adapted to obtain an inactivity timer value for a UE served by the SME. The transmitting unit is adapted to transmit the inactivity timer value to the MME for notifying the AP of the inactivity timer value for the UE. The AP and the SME are respectively adapted to maintain an inactivity timer associated with the UE based on the inactivity time value and remove resources locally used for the UE when the inactivity timer expires.

A seventh aspect of the present disclosure is an AP configured to set an inactivity timer in a radio communication network comprising the AP, a MME and a SME. The AP comprises a processor and a memory, which contains instructions executable by the processor whereby the AP is operative to obtain an inactivity timer value for one or more UEs served by the AP and transmit the inactivity timer value to the MME for notifying the SME of the inactivity timer value for the one or more UEs. For each of the one or more UEs, the AP and the SME are respectively operative to maintain an inactivity timer associated with the UE based on the inactivity timer value and remove resources locally used for the UE when the inactivity timer expires.

An eighth aspect of the present disclosure is a SME configured to set an inactivity timer in a radio communication network comprising an AP, a MME and the SME. The SME comprising a processor and a memory which contains instructions executable by the processor whereby the SME is operative to obtain an inactivity timer value for a UE served by the AP and transmit the inactivity timer value to the MME for notifying the AP of the inactivity timer value for the UE. The AP and the SME are respectively operative to maintain an inactivity timer associated with the UE based on the inactivity time value and remove resources locally used for the UE when the inactivity timer expires.

Instead of keeping the inactivity timer for UE by the MME and/or AP, both the AP and the SME are provided with an inactivity timer. In this way, the AP and the SME can monitor the inactivity timer for a UE by themselves, and autonomously release their local resources used for the UE if the inactivity timer expires. Hence, the MME doesn't have to transmit the related releasing signaling to the AP or the SME, thereby alleviating the signaling transmission load on the MME.

BRIEF DESCRIPTION OF THE DRAWINGS

The technology will be described below, by way of example, based on embodiments with reference to the accompanying drawings, wherein.

DETAILED DESCRIPTION

Figure 1:
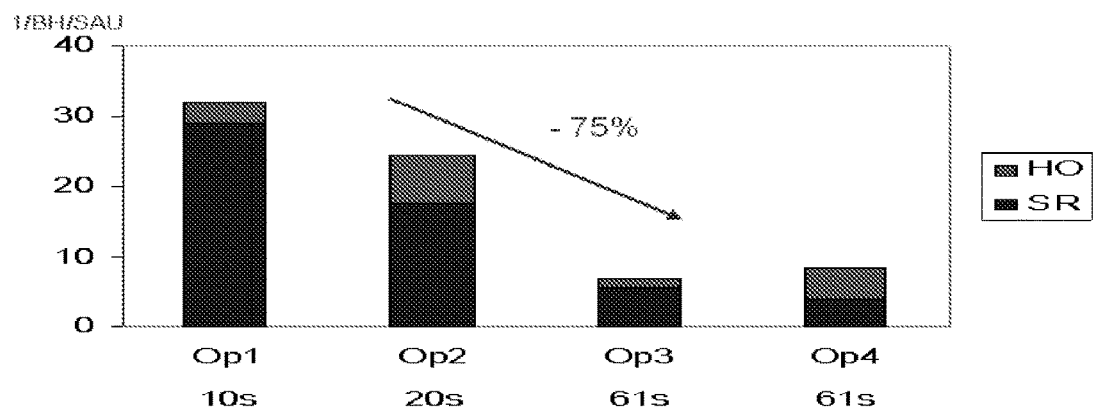
FIG. 1 illustrates signaling rates in four LTE networks with different inactivity timer settings.

Embodiments herein will be described hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understand that the embodiments are not limited to those specific terms but may be applied to all similar entities, such as base station, cell, sector, femto base station, NodeB, eNodeB, etc.

By way of example, the embodiments herein will be discussed in the context of the LTE network. It should be appreciated that the embodiments are applicable to all radio communication networks that involve setting inactivity timer for UEs.

Embodiments herein will be described below with reference to the drawings.

Figure 3:
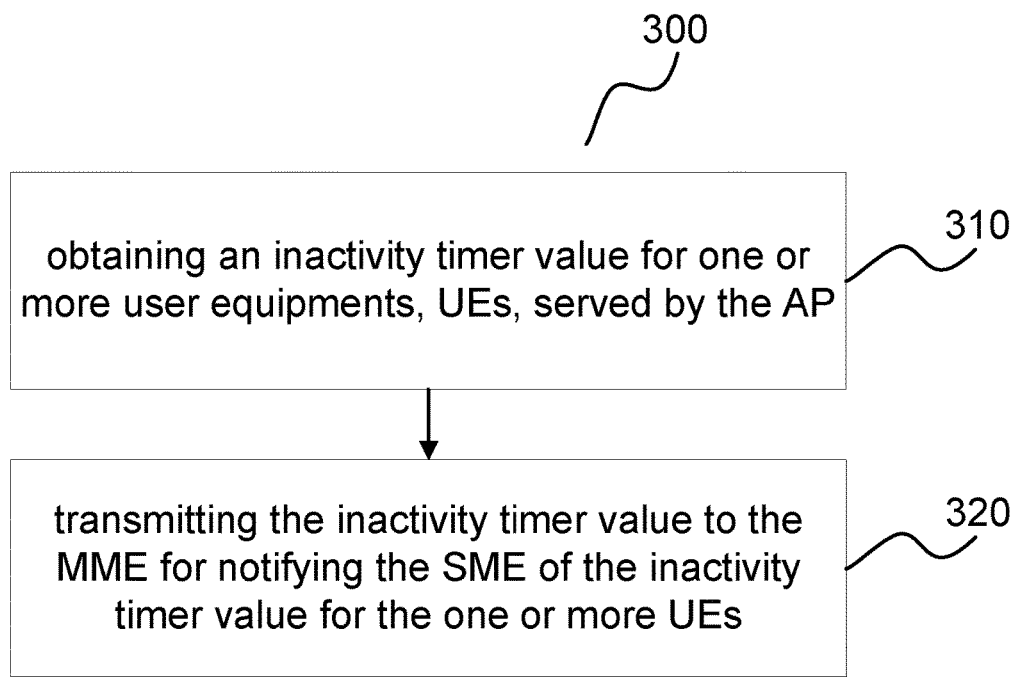
FIG. 3 schematically illustrates a flowchart of setting an inactivity timer in an AP in accordance with an embodiment.

FIG. 3 illustrates an exemplary radio communication network environment that is suitable for implementing the embodiments of the present disclosure. As shown, the radio communication network comprises the AP 220, the MME 230 and the SME 240. The UE 210 is served by the AP 220. The MME 230 and the SME 240 is on the core side of the radio communication network. The MME 230 serves to manage the UE mobility. The SME 240 is responsible for managing the session between the UE and the AP, including routing and forwarding user data packets and acting as the mobility anchor of the user plane. In the LTE network, the serving gateway (SGW) serves as the SME 240, and the AP 220 is an eNB.

Figure 4:
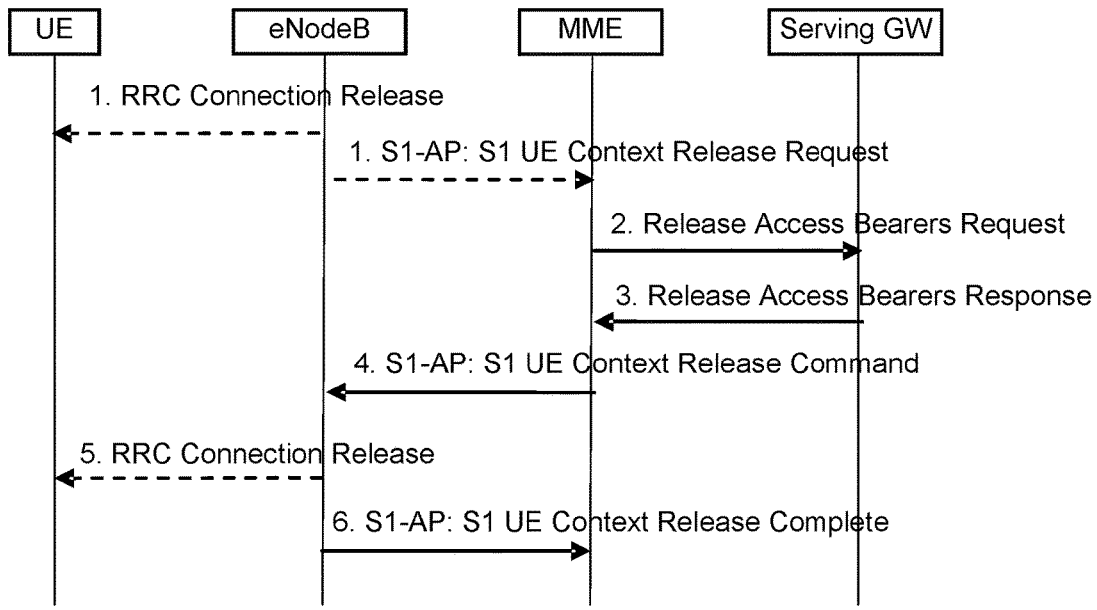
FIG. 4 schematically illustrates a typical S1 release procedure in a LTE network.

FIG. 4 schematically illustrates a flowchart of setting an inactivity timer for a UE in an AP, e.g. AP 220, in accordance with an embodiment. Here, the UE may be any device intended for requesting services via a radio communication network and configured to communicate over the radio communication network. For instance, the UE may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or personal computer (PC). The UE may be a portable, pocket-storable, hand-held, computer-comprised, or vehicle-mounted mobile device, enabled to communicate voice and/or data, via a wireless connection.

Now the process of the embodiment will be described in detail with reference to FIG. 4.

In block 310, the AP 220 obtains an inactivity timer value for one or more UEs served by the AP. The AP 220 may obtain the inactivity timer from the MME 230. Alternatively, the AP 220 may determine the inactivity timer for a UE by itself, for example, based on the inactivity timer value set for the UE in the past.

In addition, in an embodiment, the AP 220 may obtain the inactivity timer value for a UE upon receiving a service request from the UE. In another embodiment, the AP 220 may obtain the inactivity timer value for the served UEs in advance. For example, the AP 220 may predetermine a same inactivity timer value for all UEs served by the AP. In other words, all the UEs served by the AP 220 will be set with the same inactivity timer value.

It should be appreciated that the above obtaining the inactivity timer value simply is described by way of example and other suitable ways to obtain the inactivity timer value are applicable to the present disclosure.

In block 320, the AP 220 transmits the inactivity timer value to the MME 230 for notifying the SME 240 of the inactivity timer value.

In an embodiment, the AP 220 may transmit the inactivity timer value for the UE 210 to the MME 230 in the course of a service request procedure. The service request procedure can be initiatively triggered by the UE 210. It also can be triggered by the network. For example, the service request procedure is triggered when the SME 240 serving the UE receives a downlink data packet to the UE. Since the service request for example in the LTE network is known, it won't be further described for simplicity. In the LTE network, the AP 220 may transmit the inactivity timer value to the MME 230 by the Service Request message of the service request procedure, and then the MME 230 may transmit the inactivity timer value to the SME 240 by the Modify Bearer Request message of the service request procedure.

Alternatively, in the LTE network, if the AP 220 determines to set a consistent inactivity timer value for all served UEs, it may initiate an S1 Setup procedure. In the S1 Setup procedure, the AP 220 may transmit the inactivity timer value to the MME 230 via the S1 Setup Request message. The MME 230 will store this inactivity timer value and use it for each UE connected to the AP 220 in future. For example, when a UE initiates a service request to the AP 220, the MME 230 may transmit the stored inactivity timer value to the SME 240 by the by the Modify Bearer Request message.

As such, both the AP 220 and the SME 240 are provided with the inactivity timer value for the UE, which enable them to respectively maintain an inactivity timer with this timer value. When the inactivity timer maintained by the AP 220 expires, the AP 220 will automatically release all resources, in the AP 220, used for the UE. Likewise, when the inactivity timer maintained by the SME 240 expires, the SME 240 will also release all resources, in the SME 240, used for the UE.

Figure 5:
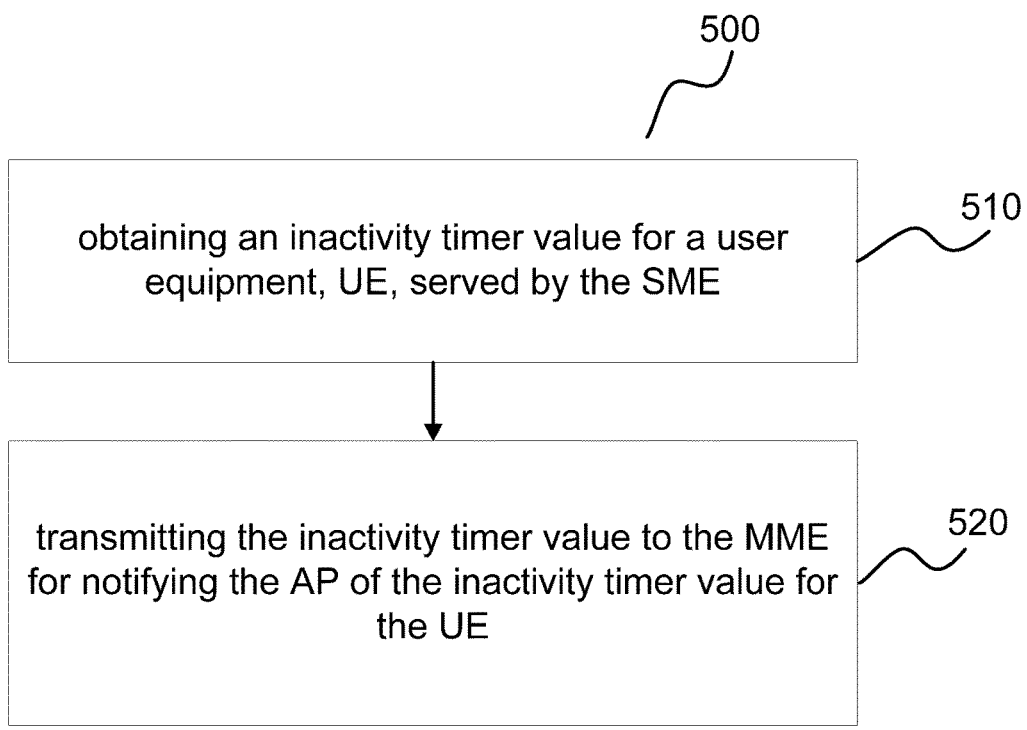
FIG. 5 schematically illustrates a flowchart of setting an inactivity timer in an SME in accordance with an embodiment.

Since both the AP and the SME are provided with the inactivity timer, they can monitor the inactivity timer for a UE, and autonomously release their local resources used for the UE if the inactivity timer expires. Hence, the MME doesn't have to transmit the related releasing signaling to the AP or the SME, thereby alleviating the signaling transmission load on the MME. In particular, if the inactivity timer is kept implicitly by the MME, in order to notify the eNB and the SGW to release the resource when the inactivity timer expires, the MME has to perform the S1 Release procedure. For example, it sends the Release Access Bearer Request to the SGW and the S1 UE context Release Command to the eNB as illustrated in FIG. 5. In this case, by practicing the embodiments in the present disclosure, the MME doesn't have to send the Release Access Bearer Request or S1 UE context Release Command. Accordingly, the SGW doesn't have to respond to the MME by the Release Access Bearer Response.

Furthermore, the AP 220 may reset the inactivity timer associated with a UE at each payload communication with the UE. In other words, during timing by the inactivity timer, if the communication between the UE and the AP 220 occurs, the inactivity timer associated with the UE will re-timing. Meanwhile, the AP 320 will also notify the SME 240 to reset its inactivity timer associated with this UE. Specifically, the AP 220 may trigger a signaling such as a ping message towards the SME 240. As such, the SME 240 is aware that there is communication between the UE and the AP 220, and thus reset its inactivity timer associated with the UE. Alternatively, the AP 220 may trigger an empty packet towards the SME 240 such that the SME 240 resets its inactivity timer associated with the UE.

Figure 2A:
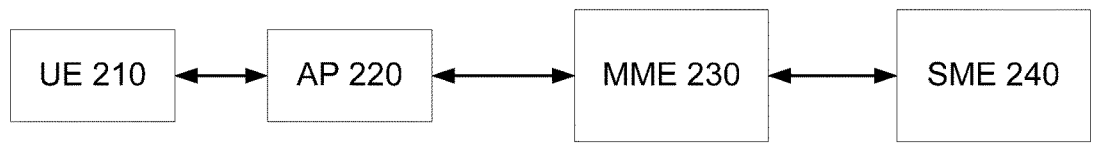
FIG. 2a-2b schematically illustrates a radio communication network environment that is suitable for implementing the embodiments of the present disclosure.
Figure 2B:
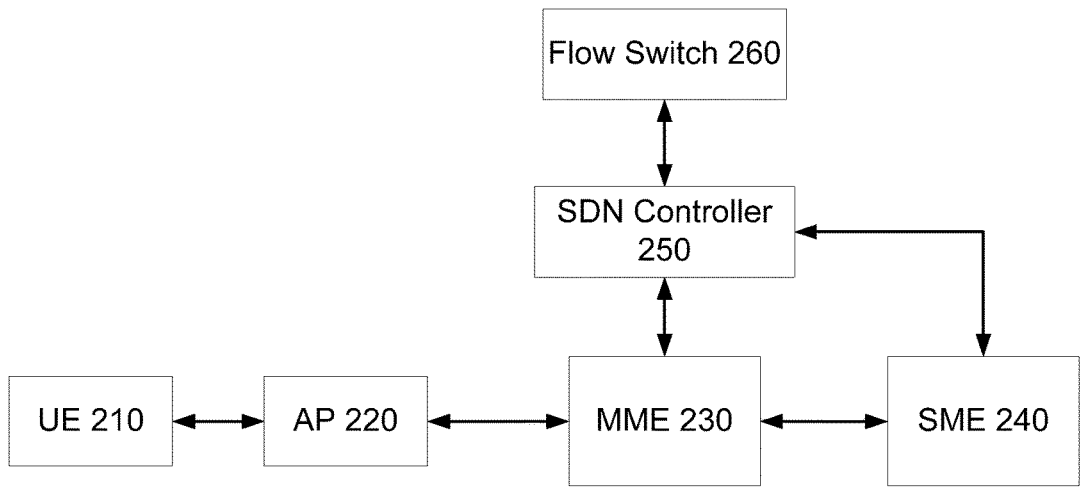

The embodiments can be practiced in the software defined network, for example, based on the LTE network. The SDN is a computer network that allows network administrators to manage network services through abstraction of lower level functionality. This is done by decoupling the system that makes decisions about where traffic is sent from the underlying systems that forward traffic to the selected destination. As shown in FIG. 2b, the SDN may comprise the SDN controller 250 and the flow switch 260. In an embodiment, after receiving the inactivity timer value from the AP 220, besides the SME 240, the MME 230 may also transmit the inactivity timer value to the flow switch 260 via the SDN controller 250. In this way, the flow switch 260 is enabled to maintain an inactivity timer with this timer value as the SME 240 is. When the inactivity timer maintained by the flow switch 260 expires, the flow switch 260 will automatically release all resources, in the flow switch 260, used for the UE, such as the switching rule associated with the UE. Alternatively, instead of the MME 230, the flow switch 260 may obtain the inactivity timer value from the SME 240 via the SDN controller 250.

FIG. 5 schematically illustrates a flowchart of setting an inactivity timer in an SME, e.g. SME 240, in accordance with an embodiment. Now the process of the embodiment will be described in detail with reference to FIG. 5.

In step 510, the SME 240 obtains an inactivity timer value for a UE 210 served by the SME. Here, the inactivity timer value can be obtained in the similar way as described above. In step 520, the SME 240 transmits the inactivity timer value to the MME 230 for notifying the AP 220 serving the UE 210 of the inactivity timer value. For example, in the LTE network, the inactivity value can be transmitted from the SME 240 to the MME 230 by a Modify Bearer Response message in the course of a service request procedure triggered by the UE 210 or the SME 240. In particular, in the service request procedure, the UE 210 transmits a Service Request to the AP 220; the AP 220 forwards the Service Request to the MME 230; then the MME 230 transmits a Modify Bearer Request to the SME 240. In response to the Modify Bearer Request, the SME 240 returns a Modify Bearer Response to the MME 230. As such, the SME 240 may transmit the inactivity timer value to the MME 230 by inserting it into the Modify Bearer Response message. Accordingly, the MME 230 may notify the AP 220 of the inactivity timer value, for example, by the UE Context Request message.

As such, both the AP 220 and the SME 240 are provided with the inactivity timer value for the UE, which enable them to respectively maintain an inactivity timer with this timer value. When the inactivity timer maintained by the AP 220 expires, the AP 220 will automatically release all resources, in the AP 220, used for the UE. Likewise, when the inactivity timer maintained by the SME 240 expires, the SME 240 will also release all resources, in the SME 240, used for the UE.

In this way, the MME doesn't have to transmit the related releasing signaling to the AP or the SME as done in the existing solution described above, thereby alleviating the signaling transmission load on the core side of the network.

Figure 6:
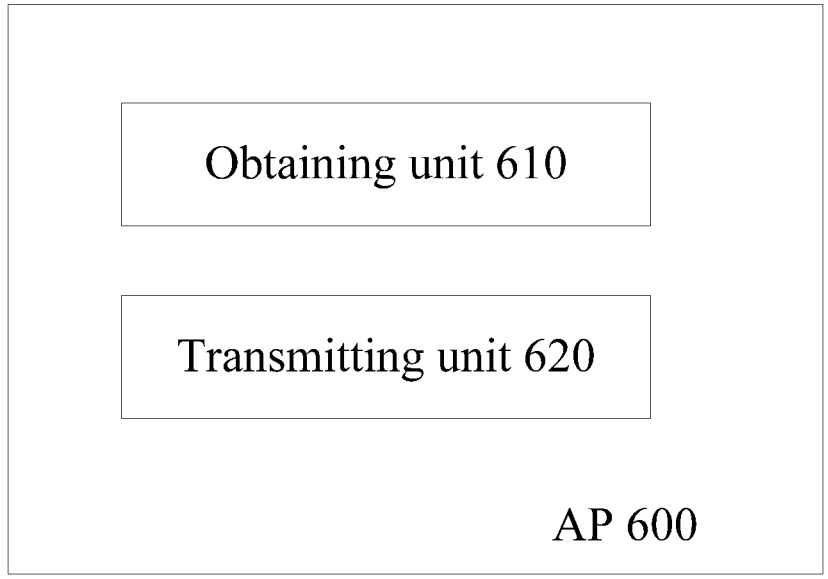
FIG. 6 schematically illustrates a block diagram of an AP configured to set an inactivity timer in accordance with an embodiment.

FIG. 6 schematically illustrates a block diagram of an AP 600 configured to set an inactivity timer in accordance with an embodiment. As illustrated in FIG. 6, the AP 600 may comprise an obtaining unit 610 and a transmitting unit 620. It should be appreciated that the AP is not limited to the shown elements, and can comprise other conventional elements and the additional elements for other purposes. Here, the AP 600 functions as the AP 220 in FIG. 2a. Now the functions of the individual units will be described in detail with reference to the FIG. 6.

The obtaining unit 610 of the AP 220 obtains an inactivity timer value for one or more UEs served by the AP. In an embodiment, the obtaining unit 610 may obtain the inactivity timer value for a UE upon receiving a service request from the UE. In another embodiment, the AP 220 may obtain the inactivity timer value for the served UEs in advance. For example, the obtaining unit 610 may determine a same inactivity timer value for all UEs served by the AP 220. In other words, all the UEs served by the AP 220 will be set with the same inactivity timer value.

The transmitting unit 620 of the AP 220 transmits the inactivity timer value to the MME 230 for notifying the SME 240 of the inactivity timer value.

In an embodiment, the transmitting unit 620 may transmit the inactivity timer value for the UE 210 to the MME 230 in the course of a service request procedure. In the LTE network, the transmitting unit 620 may transmit the inactivity timer value to the MME 230 by the Service Request message of the service request procedure, and then the MME 230 may transmit the inactivity timer value to the SME 240 by the Modify Bearer Request message of the service request procedure.

Alternatively, in the LTE network, if the AP 220 determines to set a consistent inactivity timer value for all served UEs, the transmitting unit 620 may initiate an S1 Setup procedure. In the S1 Setup procedure, the AP 220 will send an S1 Setup Request message to the MME 230. As such, the inactivity timer value can be transmitted to the MME 230 by being inserted into the S1 Setup Request message. The MME 230 will store this inactivity timer value and use it for each UE connected to the AP 220 in future. For example, when a UE initiates a service request to the AP 220, the MME 230 may transmit the stored inactivity timer value to the SME 240 by the Modify Bearer Request message.

As such, both the AP 220 and the SME 240 are provided with the inactivity timer value for the UE, which enable them to respectively maintain an inactivity timer with this timer value. When the inactivity timer maintained by the AP 220 expires, the AP 220 will automatically release all resources, in the AP 220, used for the UE. Likewise, when the inactivity timer maintained by the SME 240 expires, the SME 240 will also release all resources, in the SME 240, used for the UE.

Figure 7:
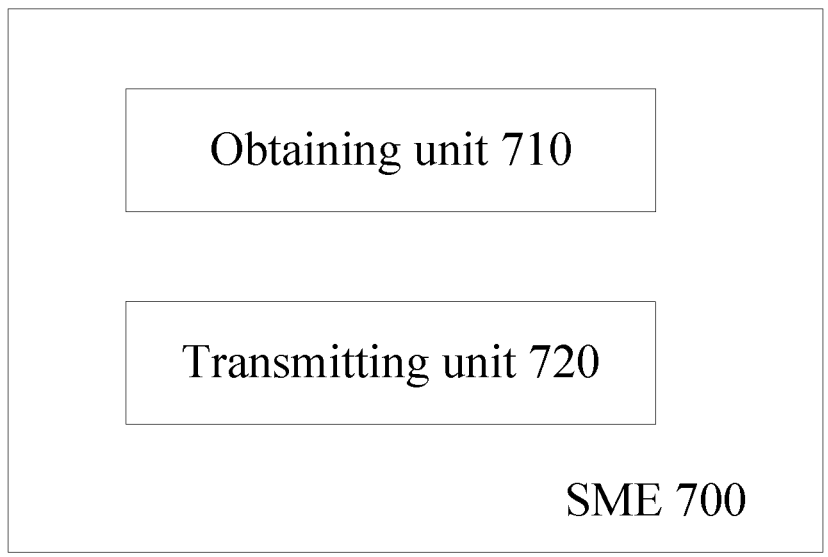
FIG. 7 schematically illustrates a block diagram of a SME configured to set an inactivity timer in accordance with an embodiment.

FIG. 7 schematically illustrates a block diagram of a SME 700 configured to set an inactivity timer in accordance with an embodiment. As illustrated in FIG. 7, the SME 700 may comprise an obtaining unit 710 and a transmitting unit 720. It should be appreciated that the SME is not limited to the shown elements, and can comprise other conventional elements and the additional elements for other purposes. Here, the SME 700 functions as the SME 240 in FIG. 2a. Now the functions of the individual units will be described in detail with reference to the FIG. 7.

The obtaining unit 710 of the SME 240 obtains an inactivity timer value for a UE 210 served by the AP 220. The transmitting unit 720 of the SME 240 transmits the inactivity timer value to the MME 230 for notifying the AP 220 of the inactivity timer value. For example, in the LTE network, the inactivity value can be transmitted to the MME 230 by a Modify Bearer Response message in the course of a service request procedure triggered by the UE 210 or the SME 240. Accordingly, the MME 230 may notify the AP 220 of the inactivity timer value.

As such, both the AP 220 and the SME 240 are provided with the inactivity timer value for the UE, which enable them to respectively maintain an inactivity timer with this timer value. When the inactivity timer maintained by the AP 220 expires, the AP 220 will automatically release all resources, in the AP 220, used for the UE. Likewise, when the inactivity timer maintained by the SME 240 expires, the SME 240 will also release all resources, in the SME 240, used for the UE.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method in an access point, AP, for setting an inactivity timer in a radio communication network comprising the AP, a mobility management entity, MME, and a session management entity, SME, the method comprising:

obtaining an inactivity timer value for at least one user equipment, UE, served by the AP;

transmitting the inactivity timer value to the MME for notifying the SME of the inactivity timer value for the at least one UE;

for each of the at least one UE, the AP and the SME respectively maintain an inactivity timer associated with the UE based on the inactivity timer value and remove resources locally used for the UE when the inactivity timer expires; and the radio communication network being a software defined network, SDN, and the inactivity timer value being transmitted by the MME to a flow switch, FS, via a SDN controller so that the FS maintains an inactivity timer associated with the UE based on the inactivity timer value and removes resources locally used for the UE when the inactivity timer expires.

2. The method of claim 1, wherein the transmitting comprises transmitting the inactivity timer value for a UE to the MME in the course of a service request procedure triggered by one of the UE and the SME.

3. The method of claim 2, wherein the inactivity timer value is transmitted from the AP to the MME by a Service Request message, and transmitted from the MME to the SME by a Modify Bearer Request message.

4. The method of claim 1, wherein the obtaining comprises obtaining a same inactivity timer value for all UEs served by the AP, and the same inactivity timer value is transmitted from the AP to the MME by an S1 Setup Request message.

5. The method of claim 4, further comprising resetting the inactivity timer associated with a UE at each payload communication with the UE.

6. The method of claim 5, wherein the resetting comprises triggering an empty packet towards the SME such that the SME resets its inactivity timer associated with the UE.

7. A method in a session management entity, SME, for setting an inactivity timer in a radio communication network comprising an access point, AP, a mobility management entity, MME, and the SME, the method comprising:
   obtaining an inactivity timer value for a user equipment, UE, served by the SME;
   transmitting the inactivity timer value to the MME for notifying the AP of the inactivity timer value for the UE;
   the AP and the SME respectively maintain an inactivity timer associated with the UE based on the inactivity time value and remove resources locally used for the UE when the inactivity timer expires; and
   the radio communication network being a software defined network, SDN, and the inactivity timer value being transmitted by the MME to a flow switch, FS, via a SDN controller so that the FS maintains an inactivity timer associated with the UE based on the inactivity timer value and removes resources locally used for the UE when the inactivity timer expires.

8. The method of claim 7, wherein the inactivity value is transmitted from the SME to the MME by a Modify Bearer Response message in the course of a service request procedure triggered by one of the UE and the SME.

9. An access point, AP, configured to set an inactivity timer in a radio communication network comprising the AP, a mobility management entity, MME, and a session management entity, SME, the AP comprising a processor and a memory, the memory containing instructions executable by said processor to configure the AP to:
   obtain an inactivity timer value for at least one user equipment, UE, served by the AP; and
   transmit the inactivity timer value to the MME for notifying the SME of the inactivity timer value for the at least one user equipment, UE;
   for each of the at least one user equipment, UE, the AP and the SME are respectively configured to maintain an inactivity timer associated with the UE based on the inactivity timer value and remove resources locally used for the UE when the inactivity timer expires; and
   the radio communication network being a software defined network, SDN, and the inactivity timer value being transmitted by the MME to a flow switch, FS, via a SDN controller so that the FS maintains an inactivity timer associated with the UE based on the inactivity timer value and removes resources locally used for the UE when the inactivity timer expires.

10. The AP of claim 9, wherein the memory contains instructions executable by the processor to further configure the AP to transmit the inactivity timer value for a UE to the MME in the course of a service request procedure triggered by one of the UE and the SME.

11. The AP of claim 10, wherein the memory contains instructions executable by the processor to further configure the AP to obtain a same inactivity timer value for all UEs served by the AP, and the same inactivity timer value is transmitted from the AP to the MME by an S1 Setup Request message.

12. A session management entity, SME, configured to set an inactivity timer in a radio communication network comprising an access point, AP, a mobility management entity, MME, and the SME, the SME comprising a processor and a memory, the memory containing instructions executable by the processor to configure the SME to:
   obtain an inactivity timer value for a user equipment, UE, served by the SME; and
   transmit the inactivity timer value to the MME for notifying the AP of the inactivity timer value for the UE;
   the AP and the SME being respectively operative configured to maintain an inactivity timer associated with the UE based on the inactivity time value and remove resources locally used for the UE when the inactivity timer expires; and
   the radio communication network being a software defined network, SDN, and the inactivity timer value being transmitted by the MME to a flow switch, FS, via a SDN controller so that the FS maintains an inactivity timer associated with the UE based on the inactivity timer value and removes resources locally used for the UE when the inactivity timer expires.

* * * * *